United States Patent

Arff et al.

[11] Patent Number: 4,764,349
[45] Date of Patent: Aug. 16, 1988

[54] OZONE GENERATOR

[75] Inventors: John H. Arff, Portland, Oreg.; Kenneth W. Mouw, Yreka, Calif.

[73] Assignee: Ozotech, Inc., Yreka, Calif.

[21] Appl. No.: 76,894

[22] Filed: Jul. 23, 1987

Related U.S. Application Data

[63] Continuation-in-part of Ser. No. 861,495, May 9, 1986, abandoned.

[51] Int. Cl.$^4$ ............................................. C01B 13/11
[52] U.S. Cl. ........................... 422/186.18; 422/186.07
[58] Field of Search ...................... 422/186.18, 186.07, 422/186.19

[56] References Cited

U.S. PATENT DOCUMENTS

| | | | |
|---|---|---|---|
| 919,403 | 4/1909 | Vosmaer | 422/186.18 |
| 1,147,265 | 7/1915 | Quain | 422/186.18 |
| 2,326,601 | 8/1943 | Arff | 422/186.18 X |
| 3,421,999 | 1/1969 | Corwin | 422/186.18 |
| 3,565,776 | 2/1971 | Arff | 422/186.18 X |
| 3,739,440 | 6/1973 | Lund et al. | 422/186.18 X |
| 4,049,552 | 9/1977 | Arff . | |
| 4,417,966 | 11/1983 | Krauss et al. | 422/186.18 X |
| 4,656,010 | 4/1987 | Leitzke et al. | 422/186.18 |

Primary Examiner—John F. Terapane
Assistant Examiner—Susan Wolffe
Attorney, Agent, or Firm—Eugene M. Eckelman

[57] ABSTRACT

A sealed glass tube has a gaseous filling which when subjected to high voltage produces a radiation of energy through the tube. An elongated electrical conductor is mounted lengthwise in the tube and subjects the gaseous filling to high voltage to provide electrical communication with the exterior of the tube and form ozone with an encircling perforated metal grid. The tube is supported within the grid by spacers secured to internally facing valleys of the fluted grid. The flutes of the grid extend fully from one end to the other to provide maximum output. In a preferred form of the invention, the rearward end of the conductor is slidably supported to for expansion and contraction. Also, the conductor includes an auxiliary portion extending through and having sealed relation with one end of the tube, the auxiliary portion having a wound connection to the conductor.

3 Claims, 2 Drawing Sheets

U.S. Patent Aug. 16, 1988 Sheet 1 of 2 4,764,349
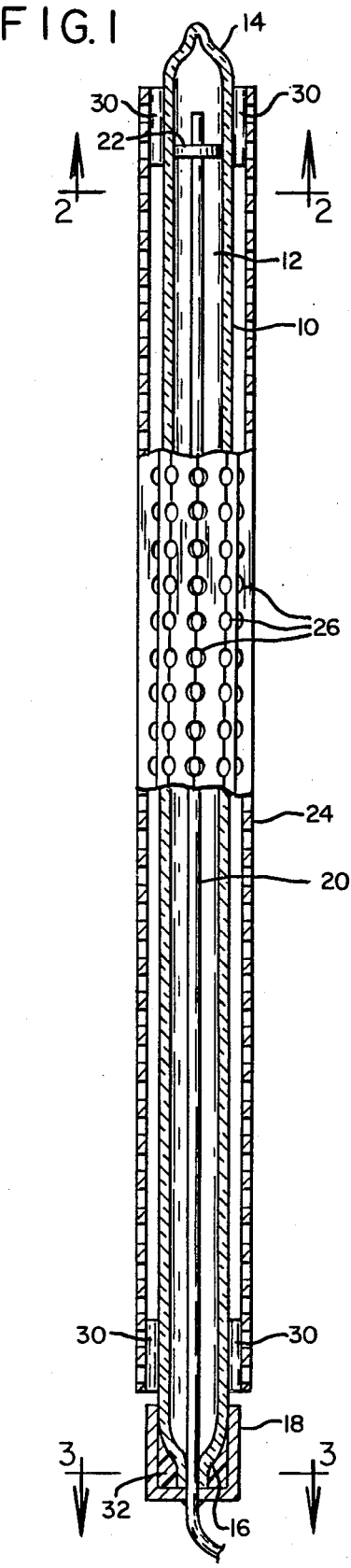
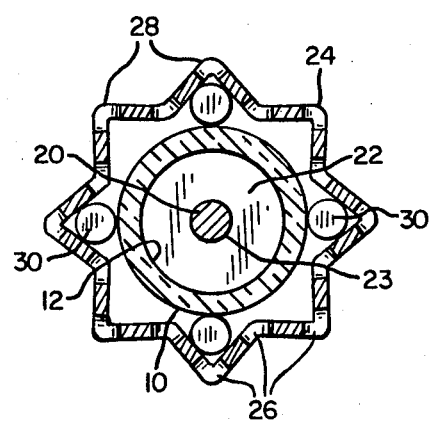
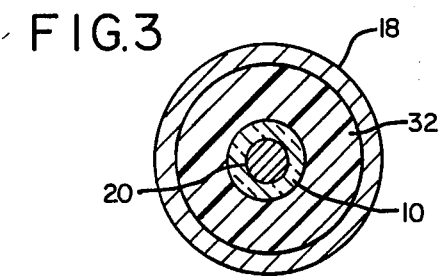
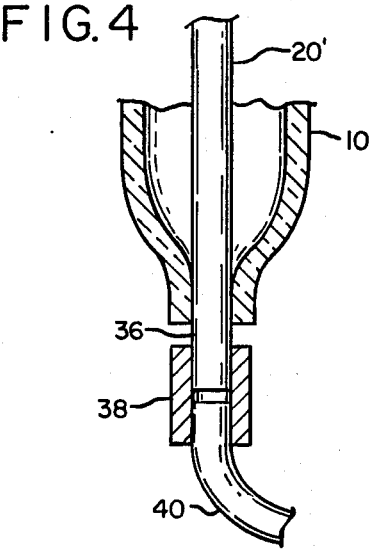

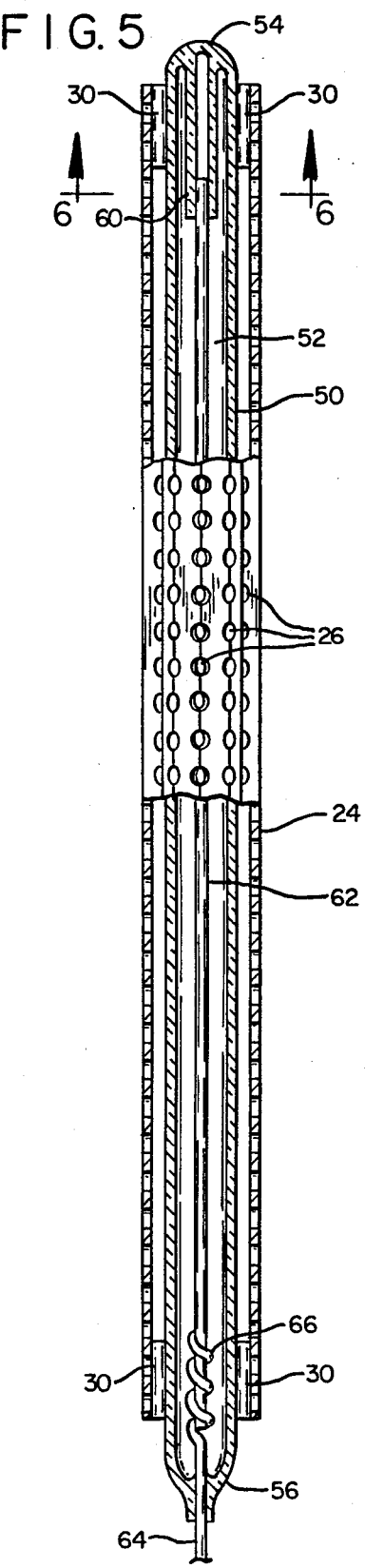
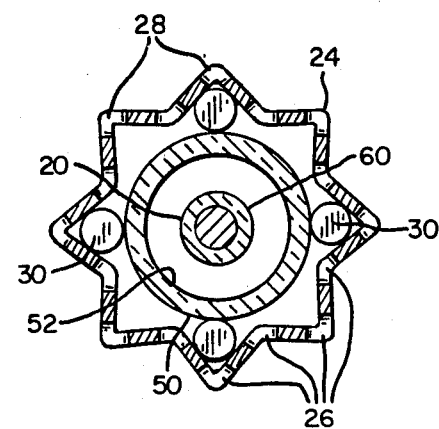
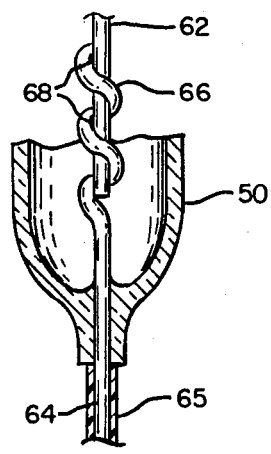

OZONE GENERATOR

REFERENCE TO PRIOR APPLICATIONS

This application is a continuation in part of Ser. No. 861,495, filed May 9, 1986, now abandoned.

BACKGROUND OF THE INVENTION

This invention relates to new and useful improvements in ozone generators.

Ozone generators frequently utilize glass tubes surrounded by a metal grid, whereby with the glass tubes filled with a gaseous substance and a high voltage applied to the interior of the tube, the combination of the tube and grid provide a condensing action to produce heavy oxygen or ozone for treating air, water, etc. A desirable feature of these generators is that they operate efficiently whereby to produce maximum oxone from minimum voltage input. A further feature desired is that the tubes be long lasting and capable of withstanding the high voltage input. It is also a desirable feature that the generators be simplified and inexpensive in construction. Prior devices have been designed in an attempt to accomplish a combination of all of such features. Exemplary prior devices are shown in U.S. Pat. Nos. 2,326,601, 3,565,776, and 4,049,552.

SUMMARY OF THE INVENTION

According to the present invention and forming a primary objective thereof, an ozone generator is provided which amounts to an improvement over prior devices.

More particularly, it is an object of the invention to provide a device of the type described having a structure which provides maximum ozone production with a minimum of the high voltage input.

Another object is to provide an ozone generator which is capable of resisting damage due to relative expansion and contraction of the parts, as well as being highly resistant to electrode junction oxidation as well as to physical abuse.

Still another object of the invention is to provide an ozone generator which is simplified in its construction and inexpensive to manufacture.

In accomplishing the above objectives, a sealed glass tube is provided having a gaseous filling which when subjected to high voltage produces a radiation of energy through the wall of the tube. An elongated electrical conductor is mounted lengthwise in the tube and extends through a major portion of the tube. An encircling fluted perforated grid surrounds the tube to produce ozone. Means are supported on the grid for concentrically locating the tube therein. The glass of the tube comprises a glass treated for resistance to heat. The tube is held concentrically within the grid by spacers secured in the flutes of the grid adjacent opposite ends. In one form of the invention, an end cap is secured to the tube by a layer of electrically insulating adhesive to prevent arcing between the tube and the cap. In this form the electrical conductor comprises tungsten for effective and long lasting generation of ozone and for compatibility with the glass in their sealed relation. In another form, the electrical conductor comprises stainless steel or similar wire and an end segment of a copper clad nickel iron alloy for generation of ozone and for compatibility with the glass. The conductors have slidable support at their rearward end in the tube to prevent forces due to expansion and contraction from building up in the tube. An exteriorly projecting portion of the conductor is covered with an insulator material, preferably a plastic coating such as pvc.

The invention will be better understood and additional objects and advantages will become apparent from the following description taken in connection with the accompanying drawings.

BRIEF DESCRIPTION OF THE DRAWINGS

FIG. 1 is an elevational view of a first form of tube of the present invention with portions of the tube being broken away to show internal structure.

FIG. 2 is an enlarged cross sectional view taken on the line 2—2 of FIG. 1;

FIG. 3 is an enlarged sectional view taken on the line 3—3 of FIG. 1;

FIG. 4 is a fragmentary sectional view showing an alternative form of connector at the input end of the tube;

FIG. 5 is an elevational view of a second form of tube with portions thereof broken away;

FIG. 6 is an enlarged cross sectional view taken on the line 6—6 of FIG. 5; and

FIG. 7 is a fragmentary sectional view showing details of structure of the connector end of the tube of FIG. 5.

DETAILED DESCRIPTION OF PREFERRED EMBODIMENTS

With reference now to the drawings, a first form of ozone generator of the present invention comprises a glass tube 10 having a gas filled interior 12 sealed at the ends 14 and 16. The end 16 comprises an input end and has an electrically conductive socket type contact 18 thereon to which the tube is arranged to be electrically connected to a source of high voltage.

Integrated with the contact 18 is a wire type conductor 20 which extends from the contact through substantially the entire length of the tube. It is held in place by the electrical connection with the contact 18 and one or more transverse discs 22 spaced from the connected end and engaged with the interior surface of the tube. In a preferred structure, discs 22 are constructed of glass so as not to cause plating on the interior of the tube. Such discs have a central bore 23 slidably receiving the conductor 20 and holding it centered within the tube. The discs 22 support the conductor in an axial position but allow the tube to slide therein to prevent forces due to expansion and contraction from building up in the tube.

Tube 10 is contained within a grid or sleeve 24 having a plurality of perforations 26. This grid is constructed of an electrically conductive material such as stainless steel, and as best seen in FIG. 2, it has V-shaped flutes 28 extending longitudinally thereof. These flutes extend the full length of the tube.

Tube 10 is supported interiorly of the grid 24 by cylindrical spacers 30 secured in the inner facing grooves of the flutes 28. The outer diameter of the tube 10 is smaller than the inner diameter of the grid and the spacers 30 have a diameter which frictionally receives the tube and holds it in place in precise concentric but spaced relation within the grid. This spacing allows ample room for air to move through between the tube and the grid. Spacers 30 are short in length such as one-half inch or less and are located in alternate inwardly facing grooves of the flutes so as to efficiently allow for end inlet and outlet of the circulating air.

In the FIG. 1 embodiment the conductor 20 comprises tungsten. It is found that tungsten serves efficiently as the conductor since it is a good conductor of electricity and also will not disintegrate under high voltage. In addition, tungsten has approximately the same coefficient of expansion as heat treated glass, such as the glass product known by the trademark Pyrex. With the glass tube 10 constructed of Pyrex and the tube 20 constructed of tungsten, their similarities in expansion and contraction provide balanced forces of expansion and contraction therebetween and the parts will not separate or crack.

With particular reference to FIG. 3, the end contact 18 is secured to the end of the tube by an electrically insulating adhesive 32, such as an epoxy resin. This adhesive shields the contact from the tube and there will be no arcing between the exterior of the tube and the contact.

With reference to FIG. 4, an alternative connection to a source of high voltage is illustrated. Whereas in FIG. 1 the conductor 20 is connected to the end cap 18, the conductor 20 in FIG. 4 is made of a length to extend a slight distance beyond the end of the tube to form a projecting end 36. This projecting end is secured in an electrically conducting sleeve connector 38 in turn securing a lead wire 40 therein as by soldering.

According to this embodiment of the invention, an ozone generator is provided which has maximum ozone output with a minimum high voltage input. That is, the use of the tungsten conductor 20 provides a long lasting conductor and one which will not deteriorate and cause plating on the interior of the tube. The efficient output of the generator is also achieved by the full length use of the grid 24 as a condensor. That is, by using the particular end spacers in the valleys of the flutes for support of the tube, the flutes 28 of the tube can extend fully from one end of the grid to the other. As described spacers 30 are short in length and need only be provided adjacent each end whereby air can readily circulate between the tube and, the grid. Since the conductor 20 and the glass have approximately the same coefficient of expansion, there are no opposing forces which might otherwise crack the tube or break loose connected parts. Also, the particular construction of the tube, the grid, and the means for mounting these two members together provides for a simplified and inexpensive construction.

With reference to FIGS. 5, 6 and 7, a second embodiment of ozone generator is illustrated. It comprises a glass tube 50 having a gas filled interior 52 and being sealed at the ends 54 and 56. Similar to the first embodiment, tube 50 is contained within a grid or sleeve 24 having a plurality of perforations 26. Grid 24 is constructed of an electrically conductive material and has V-shaped flutes 28 extending the full length thereof. Tube 50 is supported interiorly of the grid 24 by cylindrical spacers 30 secured in the inner facing grooves of the flutes 28, and as in the first embodiment, the outer diameter of the tube is smaller than the inner diameter of the grid and the spacers have a diameter which frictionally receives the tube and holds it in place in precise concentric but spaced relation within the grid, whereby air can be moved through the device between the tube and the grid. These spacers are located in alternate inwardly facing grooves of the flutes so as to efficiently allow for an end inlet and outlet of circulating air.

In this embodiment, the end 54 of the tube is formed with an inwardly extending cylindrical socket 60 open at the inwardly facing end. The tube has an inner wire conductor 62 with one end received in the socket 60 and its other end connected to an auxiliary lead wire segment 64 arranged for connection to a source of high voltage. In this form of the invention, the wire conductor 62 is formed of an inexpensive material such as stainless steel and to provide a good seal with the end 56 of the tube, the lead wire is formed of a material which is compatible in its sealing with the glass tube. For this purpose, lead wire 64 preferably comprises a copper clad nickel iron alloy. On the outside of the tube, this lead wire is covered with a PVC coating 65 or other insulation material to eliminate Fatima build-up and degradation wherein an improvement over prior inventions is realized.

In a preferred arrangement, the lead wire 64 has an inner extension 66 which is coiled around a forward end portion of the wire conductor 62. A detail of this connection is shown in FIG. 7 wherein wire lead 64 is provided with one or more coils 66 around the end of the conductor 62 and preferably has one or more spot welds 68 for providing an integral connection. The coiled connection serves as an improvement over prior inventions since it eliminates junction breakage due to oxidation and physical damage. The wire lead 64 is of sufficient size whereby to be able to support the adjacent end of the wire conductor 62 in a central position in the tube 50. Conductor 62 is thus held centered the full length of the tube by the wire lead 64 and the socket 60, the rearward end of the conductor being slidable in the socket 60 to prevent forces of expansion and contraction from building up in the tube.

The tube 50 may be constructed of a suitable glass material, such as lead glass. The copper clad nickel alloy lead 64 is compatible in its sealing connection with the glass to provide a good seal at the end 56 when the glass is molded around the wire segment 64. This embodiment, similar to the first embodiment, provides an ozone generator which has maximum ozone output with a minimum high voltage input. The particular arrangement of the stainless steel wire conductor 62 and its lead wire 64, and the particular connection thereto, provides an inexpensive tube structure and one which comprises an improvement over prior devices. There is an efficient production of ozone through a combination of condenser action (primary means), corona discharge and ultraviolet (secondary bonuses).

It is to be understood that the forms of our invention herein shown and described are to be taken as preferred examples of the same and that various changes in the shape, size and arrangement of parts may be resorted to without departing from the spirit of our invention, or the scope of the subjoined claims.

Having thus described our invention, we claim:

1. An ozone generator comprising
a sealed glass tube having forward and rearward ends and also having a gaseous filling which when subjected to high voltage produces a radiation of energy through the wall of the tube,
an elongated electrical conductor disposed lengthwise in said tube and having forward and rearward ends,
said forward end of said conductor projecting in sealed relation from the forward end of said tube and arranged for connection to a source of high voltage,
said conductor extending axially in said tube whereby to subject said gaseous filling to high voltage and provide electrical communication to the exterior of the tube, support means in said tube spaced rearwardly from said forward end slidably supporting the rearward end of said conductor to allow for expansion and contraction of said conductor, an encircling perforated grid surrounding said tube and being arranged to form a shield for energy radiating from said tube to produce ozone, said grid comprising a metal member larger in diameter than said tube whereby the inner diameter thereof is larger than the outer diameter of said tube to form a space therebetween, said grid being fluted, having alternate ridges and valleys extending fully from end to end of said metal member, and inserts secured in said valleys adjacent opposite ends and interiorly of said grid, said inserts having a thickness greater than the depth of said valleys to hold said tube in concentric spaced relation from said grid.

2. The ozone generator of claim 1 wherein said forward end of said conductor includes an auxiliary supporting segment having a wound connection to said conductor and projects from said glass in said sealed relation, said means at the rearward end of said tube which supports said conductor comprising a forwardly open socket molded in the rearward end of said tube and slidably receiving said conductor.

3. The ozone generator of claim 2 wherein the projecting auxiliary supporting segment is covered with an insulating material.

* * * * *